United States Patent
Davis et al.

[11] Patent Number: 6,003,849
[45] Date of Patent: Dec. 21, 1999

[54] HYBRID ISOLATOR AND STRUCTURAL CONTROL ACTUATOR STRUT

[75] Inventors: L. Porter Davis; T. Tupper Hyde, both of Phoenix, Ariz.

[73] Assignee: Honeywell Inc., Minneapolis, Minn.

[21] Appl. No.: 08/811,562

[22] Filed: Mar. 4, 1997

[51] Int. Cl.⁶ .............................. F16M 1/00; F16F 9/10; B60K 5/12

[52] U.S. Cl. ................. 267/140.14; 188/298; 188/266.7; 188/282.3; 188/378; 267/136; 267/217; 267/219; 267/122

[58] Field of Search ................................... 188/378–380, 188/266.7, 298, 267, 266.2, 322.19, 311, 314, 322.12, 282.2, 282.3, 282.4, 322.13, 266.8; 267/136, 140.15, 122, 140.14, 140.13, 217, 219, 218, 140.16; 248/550, 636, 562, 638; 701/37, 38; 280/124.108, 5.515, 5.507, 5.514, 6.159; 180/300, 312, 902; 92/37–39

[56] References Cited

U.S. PATENT DOCUMENTS

| | | | |
|---|---|---|---|
| 4,729,459 | 3/1988 | Inagaki et al. | 188/266.7 |
| 4,789,142 | 12/1988 | Hoying et al. | 267/140.15 |
| 4,919,402 | 4/1990 | Doi | 267/219 |
| 5,105,918 | 4/1992 | Hagiwara et al. | 188/266.7 |
| 5,174,552 | 12/1992 | Hodgson et al. | 188/282.3 |
| 5,238,232 | 8/1993 | Kobayashi et al. | 267/140.14 |
| 5,249,783 | 10/1993 | Davis | 188/298 |
| 5,344,128 | 9/1994 | Kobayashi et al. | 267/140.14 |
| 5,356,123 | 10/1994 | Hamada et al. | 267/140.14 |
| 5,366,211 | 11/1994 | Hamada et al. | 267/140.14 |
| 5,439,204 | 8/1995 | Yamazoe et al. | 267/140.14 |
| 5,628,499 | 5/1997 | Ikeda et al. | 267/140.15 |
| 5,647,579 | 7/1997 | Satoh | 267/140.14 |
| 5,779,231 | 7/1998 | Okazaki et al. | 267/140.14 |

FOREIGN PATENT DOCUMENTS 59001829  1/1984  European Pat. Off. .

*Primary Examiner*—Douglas C. Butler
*Attorney, Agent, or Firm*—Thomas A. Rendos; Robert E. Greenstein

[57] ABSTRACT

A vibration damping and isolation apparatus including a passive damping mechanism and an active enhancement mechanism. The passive damping mechanism operates to dissipate vibratory and shock forces applied to the vibration damping and isolation apparatus. The passive damping mechanism includes first and second spaced damping elements. A first resilient structure connects the first damping element to the second damping element to define a primary fluid chamber between the first and second damping elements. The passive damping mechanism further includes a second resilient structure that defines a secondary fluid chamber which is in fluid communication with the primary fluid chamber via a fluid flow orifice. A fluid fills the primary fluid chamber, the secondary fluid chamber and the fluid flow orifice. The active enhancement mechanism includes a system for sensing changes in fluid pressure, loads or other parameters of the passive damping mechanism as a result of the forces applied to the vibration damping and isolation apparatus. An actuator system of the active enhancement mechanism is coupled to the sensing system and acts on the passive damping mechanism, to change the fluid pressure within the passive damping mechanism in response to the sensing system or external commands. By actively changing the fluid pressure within the passive damping mechanism in response to forces, the active enhancement mechanism enhances the vibratory and shock dissipation of the passive damping mechanism and can actively change the stroke of the apparatus or force exerted by the apparatus.

16 Claims, 1 Drawing Sheet

HYBRID ISOLATOR AND STRUCTURAL CONTROL ACTUATOR STRUT

BACKGROUND OF THE INVENTION

This invention relates to the field of vibration damping and isolation. In particular, the present invention is a passive viscous damping and isolation system with active enhancement.

Precision structural systems carrying a load, such as a telescope system, are susceptible to disturbances that produce structural vibrations. Such vibrations may be contributed to the system by components or assemblies of the structural systems themselves, for example, reaction wheel assemblies used to point the telescope system. Since such precision structures tend to have little inherent damping, these vibrations can lead to serious performance degradation. Therefore, an efficient means of damping and isolating the load carried by the precision structures in a controlled manner is of considerable importance.

Both active damping isolation systems and passive damping isolation systems have been utilized. The limitations of passive damping isolation systems are well known. In particular, while passive isolators provide exceptional isolation at high frequency (above $\sqrt{2}$ times resonant frequency), passive isolators amplify disturbances at low frequency. This deficiency in passive isolators is due primarily to the static stiffness requirements of flexure components of the passive isolators. In addition, in passive isolators the frequency dependence of the vibration damping is not easily tailored, since tailoring the damping typically requires changing the stiffness elements and/or the damping fluid. Changing of the damping fluid is a time consuming process which usually can only be performed properly in a factory setting. Active damping isolation systems, on the other hand, do provide desirable vibration damping at low frequency, and the frequency dependence of the vibration damping and isolation transmissibility of active isolators can be easily tailored. However, active isolators are typically more complex, and are higher in weight than comparable passive isolators. In addition, active isolators require power for operation, and as such, become inoperable upon a power failure. Hence, making active isolators unattractive from a reliability standpoint.

There is a need for improved damping isolation systems. In particular, there is a need for a damping isolation system that provides desirable vibration damping at high and low frequencies. In addition, the damping isolation system should provide easy tailoring of the frequency dependence of the vibration damping. The damping isolation system should provide these features while maintaining a weight efficient structure.

SUMMARY OF THE INVENTION

The present invention is a structural apparatus. The structural apparatus includes a passive damping mechanism and an active enhancement mechanism. The passive damping mechanism operates to dissipate forces applied to the passive damping mechanism. The passive damping mechanism includes a first damping element and a second damping element spaced from the first damping element. A first resilient structure connects the first damping element to the second damping element to define a primary fluid chamber between the first and second damping elements. A second resilient structure is connected to the first damping element. The second resilient structure defines a secondary fluid chamber which is in fluid communication with the primary fluid chamber via a fluid flow orifice extending through the first damping element. A fluid fills the primary fluid chamber, the secondary fluid chamber and the fluid flow orifice. The fluid has a fluid pressure within the primary and secondary chambers and the fluid flow orifice. The active enhancement mechanism enhances the force dissipation of the passive damping mechanism. The active enhancement mechanism includes an actuator system which acts on the passive damping mechanism, to change the fluid pressure within the passive damping mechanism to enhance the force dissipation of the passive damping mechanism and/or to provide actuation as may be required for control.

DETAILED DESCRIPTION OF THE PREFERRED EMBODIMENT

Figure 1:
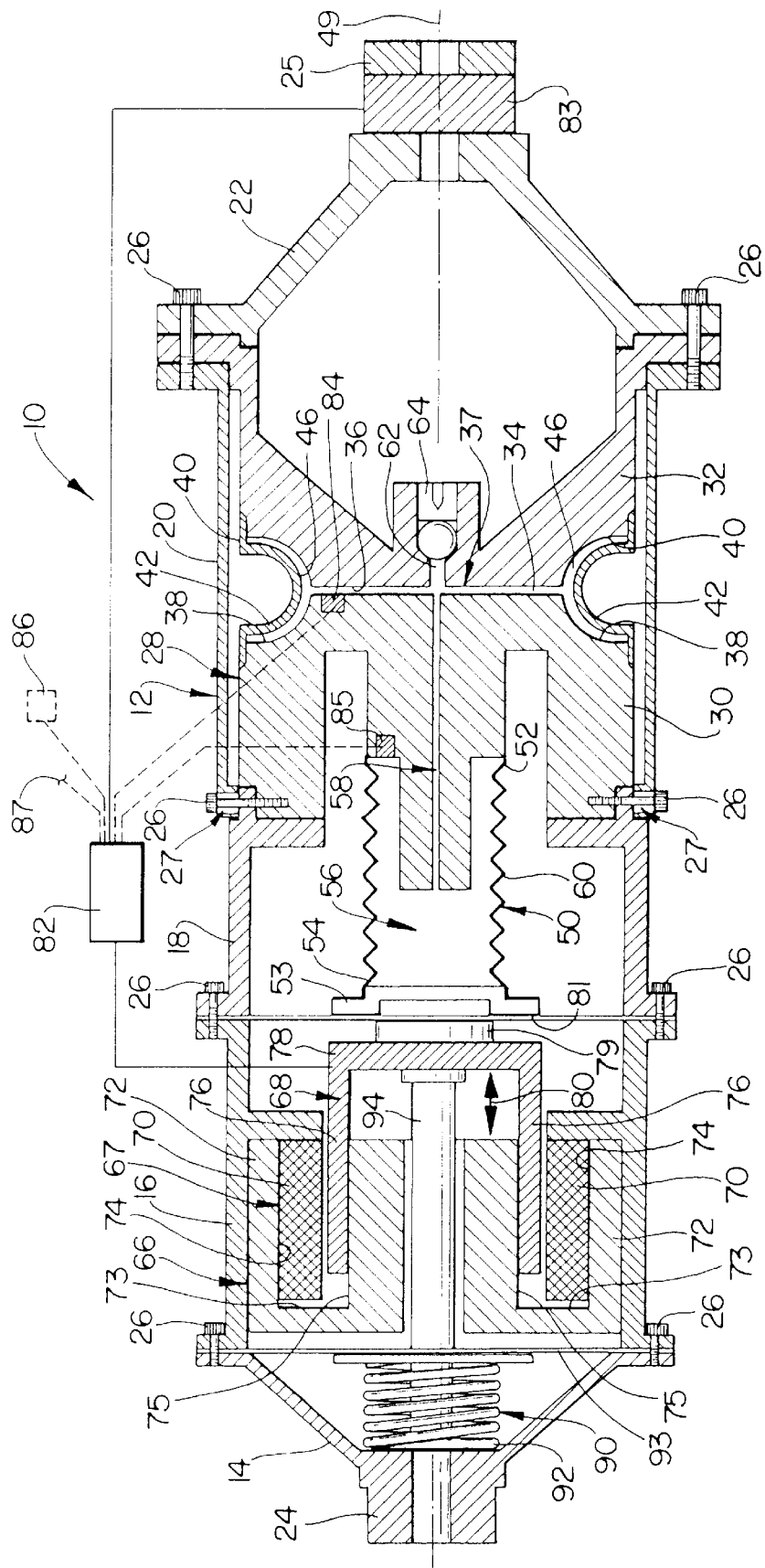
FIG. 1 is a sectional view of a vibration damping and isolation apparatus in accordance with the present invention.

A structural apparatus or strut, such as a vibration damping and isolation apparatus 10, in accordance with the present invention is illustrated in FIG. 1. The damping and isolation apparatus 10 includes an outer housing 12 defined by a first end cap 14, a proximal housing section 16, an intermediate housing section 18, a terminal housing section 20 and a second end cap 22. The first and second end caps 14 and 22 include end fittings 24 and 25, respectively, for adaptation of the damping and isolation apparatus 10 to a structure, such as a truss structure. Typically, the end fitting 25 is secured to ground while the end fitting 24 is secured to a payload or like structure. The first and second end caps 14 and 22, and the proximal, intermediate and terminal housing sections 16, 18 and 20 are secured together via suitable fasteners 26.

The damping and isolation apparatus 10 further includes a passive damping mechanism 28 for dissipating vibratory and shock forces applied to the outer housing 12. The passive damping mechanism 28 is defined by a cylindrical, proximal damping element 30 and a cylindrical, distal damping element 32. The proximal element 30 is secured to the intermediate and terminal housing sections 18 and 20 by the fasteners 26. The terminal housing 20 includes elongated apertures 27 through which the fasteners 26 pass. The elongated slots 27 are oriented such that their lengthwise dimension is parallel to a longitudinal axis 49 of the outer housing 12. The elongated slots 27 permit the proximal damping element 30 to move relative to the distal damping element 32 along the longitudinal axis 49. The length of the elongated slots 27, in cooperation with the fasteners 26, act as stroke limiting stops for the passive damping mechanism 28. The distal element 32 is secured by fasteners 26 to the terminal housing section 20 and the second end cap 22.

The proximal element 30 is provided with a circular planar surface 34 which faces and is spaced from a circular planar surface 36 of the distal element 32 to define a portion of a primary side fluid chamber 37. In addition, the proximal element 30 includes a peripheral arced cutout 38 which faces and is spaced from a peripheral arced cutout 40 of the distal element 32. In a preferred embodiment, the proximal and distal damping elements 30 and 32 are resiliently coupled via a ring-shaped arch flexure 42. Alternatively, the proximal and distal damping elements 30 and 32 can be resiliently coupled via a multi-convoluted bellows. The arch flexure 42 resiliently joins the proximal and distal elements 30 and 32 in the vicinity of the arced cutouts 38 and 40. As seen in FIG. 1, the arch flexure 42 is spaced from the arced cutouts 38 and 40, and thereby defines an arcuate portion 46 of the primary side fluid chamber 37. The arch flexure 42 is constructed to be deformable along the longitudinal axis 49 of the damping and isolation apparatus 10 but otherwise volumetrically rigid.

The passive damping mechanism 28 further includes a resilient fluid bellows 50 which is coupled at a first end 52 to the proximal damping element 30. A bellows plug 53 is secured to a second end 54 of the fluid bellows 50. The fluid bellows 50 defines a secondary side fluid chamber 56 that communicates with the primary side fluid chamber 37 through a tubular fluid flow restricting orifice 58 extending axially through the proximal element 30. A suitable fluid 60, such as a damping silicon fluid available from Dow Corning, is applied through an fill port 62 in the distal damping element 32 to fill the primary side fluid chamber 37, the secondary side fluid chamber 56 and the fluid flow restricting orifice 58. The fluid 60 is applied through the fill port 62 after the damping mechanism 28 has been evacuated. Once filled with fluid 60, the passive damping mechanism 28 is then sealed by a plug 64 secured within the fill port 62.

In operation when vibratory and shock forces are applied to the outer housing 12, the primary side fluid chamber 37 deflects forcing the relatively incompressible fluid 60 through the fluid flow restricting orifice 58 to and from the secondary side fluid chamber 56 depending on the direction (i.e., compressive or extending) of the vibratory and shock forces. As the fluid 60 is forced through the orifice 58, the fluid creates an opposing force which is a very linear function of velocity and purely dissipative. This results in damping which can be controlled by controlling the diameter and/or length of the orifice 58 and/or the viscosity of the fluid 60. The arch flexure 42 and bellows 50 provide static stiffness which can be appropriately set by selecting the material of the arch flexure 42 and bellows 50, the thickness of the material, and the number and/or dimensions of the convolutes. The operation and properties of a passive damping mechanism of this type are described in U.S. Pat. No. 5,249,783 to Davis and entitled "Vibration Absorbing Damper" which is hereby incorporated herein by reference thereto.

As seen in FIG. 1, the damping and isolation apparatus 10 further includes an active enhancement mechanism 66 for enhancing the vibratory and shock dissipation of the passive damping mechanism 28 and allowing command of strut force or stroke. In a preferred embodiment, the active enhancement mechanism 66 has a voice coil actuator system 67 (such as a Lorentz force actuator) defined by a coil 68 movable relative to stationary permanent magnets 70. Alternatively, the active enhancement mechanism 66 could have a servo motor actuator system or a volume actuated piezoelectric element actuator system.

A steel casing 72 of the active enhancement mechanism 66 is fixed within the proximal housing section 16 of the outer housing 12. The steel casing 72 includes a circular channel 73 having an outer wall 74 and an inner wall 75. The circular channel 73 houses the stationary permanent magnets 70 which are secured to the outer wall 74. The coil 68 is defined by a tubular portion 76 and a circular base portion 78. The coil 68 is axially movable (as indicated by the double headed arrow 80) relative to the magnets 70 upon the application of current from a suitable microprocessor/power source 82 to the coil 68. As seen in FIG. 1, the tubular portion 76 of the coil 68 moves axially along the inner wall 75 of the channel 73. In a preferred embodiment, the base portion 78 of the coil 68 acts on the passive damping mechanism 28 by applying appropriate compressive and extensive forces to the bellows 50 through a thrust element 79 and a first centering flexure 81 which is connected to the outer housing 12. It is to be understood, that the centering flexure 81 can be eliminated by the radial stiffness of bellows 50.

Alternatively, the coil 68 could apply appropriate compressive and extension forces to the arch flexure 42. However, the low frequency vibration suppression provided by the coil 68 acting on the bellows 50 is superior to that provided when the coil 68 would act on the arch flexure 42. The coil 68 acting on the arch flexure 42 provides better payload isolation control at high frequency than the coil 68 acting on the bellows 50.

The active enhancement mechanism 66 further includes a sensing system. In a preferred embodiment, the sensing system is defined by a load sensor 83 positioned in the end cap 22. The load sensor 83 senses changes in loads acting on the vibration damping and isolation apparatus 10. The changes in loads are a result of the vibratory and shock forces applied to the outer housing 12. As seen in FIG. 1, the load sensor 83 is coupled to the coil 68 of the of the voice coil actuator system 67 through the microprocessor/power source 82. Hence in operation, changes in loads acting on the vibration damping and isolation apparatus 10 (caused by vibratory and shock forces applied to the outer housing 12) sensed by the load sensor 83 are continuously communicated to the microprocessor/power source 82, such that the microprocessor/power source 82 continuously varies the current delivered to the coil 68, such that the coil 68 applies appropriate compressive and extension forces (directed along the axis 49) to the bellows 50 to continuously change the fluid pressure in the passive damping mechanism 28 and thereby enhance the vibratory and shock dissipation of the passive damping mechanism 28.

Alternatively, the sensing system can be defined by a fluid pressure sensor 84 that is mounted within the proximal damping element 30 and is in contact with the fluid 60 within the primary side fluid chamber 37; or a fluid pressure sensor 85 that is mounted within the distal damping element 32 and is in contact with the fluid 60 within the secondary side fluid chamber 56. The fluid pressure sensors 84 and 85 operate identically, so only the fluid pressure sensor 84 will be described with particularity. The sensing system 84 senses changes in fluid pressure within the primary side fluid chamber 37 of the passive damping mechanism 28. The changes in fluid pressure in the primary side fluid chamber 37 are a result of the vibratory and shock forces applied to the outer housing 12. As seen in FIG. 1, the sensing system 84 is coupled to the coil 68 of the of the voice coil actuator system 67 through the microprocessor/power source 82. Hence in operation, changes in fluid pressure within the primary side fluid chamber 37 (caused by vibratory and shock forces applied to the outer housing 12) sensed by the fluid pressure sensor 84 are continuously communicated to the microprocessor/power source 82, such that the microprocessor/power source 82 continuously varies the current delivered to the coil 68, such that the coil 68 applies appropriate compressive and extension forces (directed along the axis 49) to the bellows 50 to continuously change the fluid pressure in the passive damping mechanism 28 and thereby enhance the vibratory and shock dissipation of the passive damping mechanism 28.

In another alternative embodiment, the sensing system can be defined by a feedback sensor 86 remote from and external to the vibration damping and isolation apparatus 10. The feedback sensor 86 can sense changes in forces (such as payload motion) acting on the vibration damping and isolation apparatus 10. The feedback sensor 86 is coupled to the coil 68 through the microprocessor/power source 82 and operates in a manner likewise to that described above for the load sensor 83. In a further alternative embodiment, the microprocessor/power source 82 can receive commands from a source 87 external to and remote from the vibration damping and isolation apparatus 10 to change the fluid pressure within the passive damping mechanism 10. The command can be issued to change the fluid pressure as a result of forces acting on the apparatus 10 as previously described or to simply change the strut force or stroke.

Hence in operation, changes in fluid pressure within the primary side fluid chamber 37 (caused by vibratory and shock forces applied to the outer housing 12) sensed by the sensing system 84 are continuously communicated to the microprocessor/power source 82, such that the microprocessor/power source 82 continuously varies the current delivered to the coil 68, such that the coil 68 applies appropriate compressive and extension forces (directed along the axis 49) to the bellows 50 to continuously change the fluid pressure in the passive damping mechanism 28 and thereby enhance the vibratory and shock dissipation of the passive damping mechanism 28.

Lastly, the vibration damping and isolation apparatus 10 includes a thermal compensation mechanism 90 that acts on the passive damping mechanism 28 to maintain a desired constant fluid pressure within the passive damping mechanism 28 through the effects of temperature changes on the vibration damping and isolation apparatus 10. The temperature compensation mechanism 90 includes a preload spring 92 that applies a compressive force through a second centering flexure 93, a thrust rod 94 and the base portion 78 of the coil 68 to the bellows 50 of the passive damping mechanism 28. The preload spring 92 can also be used to center the bellows 50 in its range of motion when the apparatus 10 is under a static load such as may be caused when isolating a mass in a gravity field.

This vibration damping and isolation apparatus 10 includes a passive damping mechanism 28 that provides exceptional vibration and shock damping at high frequencies. The active enhancement mechanism 66 enhances the operation of the passive damping mechanism 28 by providing exceptional vibration and shock damping at low frequencies, while the microprocessor/power source 82 and the sensing system allow the frequency dependence of the vibration and shock damping of the vibration damping and isolation apparatus 10 to be easily tailored to the current vibration and shock conditions. In addition, the arrangement of the passive damping mechanism 28 and the active enhancement mechanism 66 allows the passive damping mechanism 28 to operate without operation of the active enhancement mechanism 66. Hence, the active enhancement mechanism 66 can be powered down in the event of extreme vibratory and shock forces or when power conservation is desired (such as during launch), with the passive damping mechanism 28 providing acceptable vibration and shock dissipation. Moreover, upon a failure of the microprocessor/ power source 82 and or the sensing system and subsequent inoperation of the active enhancement mechanism 66, the arrangement of the passive damping mechanism 28 and the active enhancement mechanism 66 allows the passive damping mechanism 28 to remain operational to dissipate vibratory and shock forces applied to the outer housing 12. In addition, this vibration damping and isolation apparatus 10 provides these features while maintaining a weight efficient structure.

Although the present invention has been described with reference to preferred embodiments, workers skilled in the art will recognize that changes may be made in form and detail without departing from the spirit and scope of the invention.

We claim:

1. A structural apparatus, comprising:
   a passive damping mechanism for dissipating forces applied to the passive damping mechanism, the passive damping mechanism including:
   a first damping element;
   a second damping element spaced from the first damping element;
   a first resilient structure for connecting the first damping element to the second damping element and for defining a primary fluid chamber between the first and second damping elements;
   a second resilient structure connected to the first damping element, the second resilient structure defining a secondary fluid chamber which is in fluid communication with the primary fluid chamber via a fluid flow orifice extending through the first damping element; and
   a fluid filling the primary fluid chamber, the second fluid chamber and the fluid flow orifice, the fluid having a fluid pressure within the primary and secondary fluid chambers and the fluid flow orifice; and
   an active enhancement mechanism including:
   an electronic controller;
   an electromechanical actuator located within the structural apparatus and responsive to control signals from said electronic controller to exert force on the second resilient structure to change fluid pressure within the secondary fluid chamber, orifice and primary fluid chamber.

2. The structural apparatus of claim 1 wherein the active enhancement mechanism further includes:
   a sensor connected to said structural apparatus for providing a sensor signal to said electronic controller to change said control signals as a function of a force applied to the structural apparatus.

3. The structural apparatus of claim 2 wherein said sensor detects pressure changes within the passive damping apparatus.

4. The structural apparatus of claim 3 wherein said sensor senses changes in fluid pressure within the primary fluid chamber.

5. The structural apparatus of claim 3 wherein said sensor senses changes in fluid pressure within the secondary fluid chamber.

6. The structural apparatus of claim 2 wherein said sensor senses changes in loads caused by forces applied to the passive damping mechanism.

7. The structural apparatus of claim 2 wherein the electromechanical actuator comprises a stationary electromagnet located within the structural apparatus and an assembly that is magnetically moved on a longitudinal axis by the fixed electromagnet to exert force to expand and contract the second resilient structure on said longitudinal axis.

8. The structural apparatus of claim 7 wherein the electronic controller comprises a microprocessor for providing variable current to said electromagnet to change the position of said assembly.

9. The structural apparatus of claim 8 wherein the coil assembly applies the appropriate forces to the second resilient structure and wherein the appropriate forces compress and extend the second resilient structure and are directed along the longitudinal axis of the passive damping mechanism.

10. The structural apparatus of claim 7, and further including a temperature compensation mechanism that acts on the passive damping mechanism to maintain a desired constant fluid pressure within the passive damping mechanism through the effects of temperature changes on the structural apparatus.

11. The structural apparatus of claim 10 wherein the temperature compensation mechanism includes a preload spring that applies forces to one of the first and second resilient structures.

12. The structural apparatus of claim 11 wherein the preload spring applies the forces to the second resilient structure.

13. The structural apparatus of claim 1 wherein said electronic controller produces said control signal in response to commands generated at a remote location to the structural apparatus.

14. The structural apparatus of claim 1 wherein the electromechanical actuator is a voice coil.

15. The structural apparatus of claim 1 wherein the electromechanical actuator is a Lorentz force actuator.

16. The structural apparatus of claim 1 wherein the second resilient structure comprises a bellows.

\* \* \* \* \*